Oct. 16, 1934.  A. SOUKUP  1,976,969
METHOD OF MAKING INLAYS
Filed Feb. 15, 1934  3 Sheets-Sheet 1
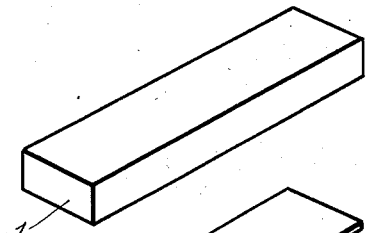
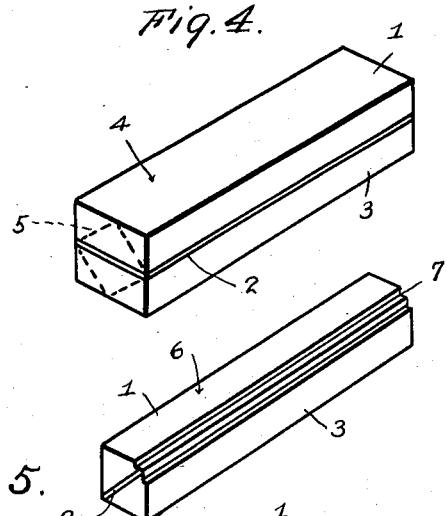
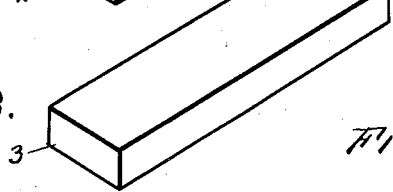
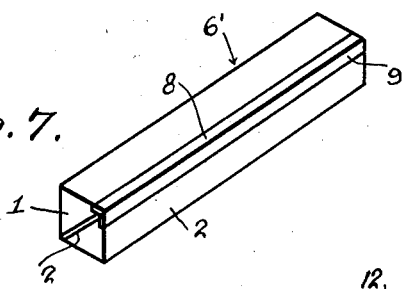
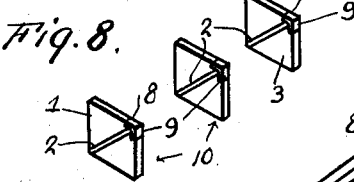
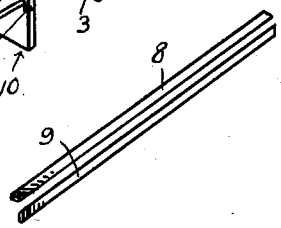
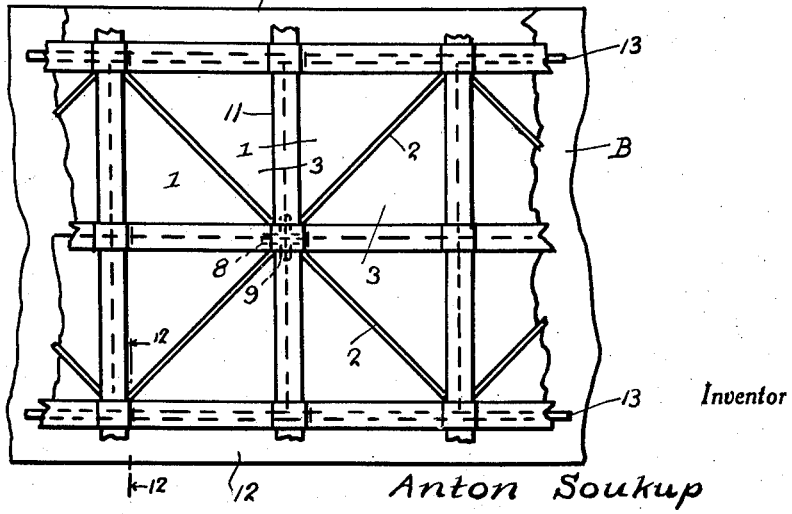
Inventor
Anton Soukup
By Clarence A. O'Brien
Attorney Oct. 16, 1934.  A. SOUKUP  1,976,969
METHOD OF MAKING INLAYS
Filed Feb. 15, 1934  3 Sheets-Sheet 2

Inventor

Anton Soukup

By Clarence A. O'Brien
Attorney

Oct. 16, 1934.   A. SOUKUP   1,976,969
METHOD OF MAKING INLAYS
Filed Feb. 15, 1934   3 Sheets-Sheet 3

Inventor
Anton Soukup
By Clarence A. O'Brien
Attorney

Patented Oct. 16, 1934

1,976,969

UNITED STATES PATENT OFFICE 1,976,969

METHOD OF MAKING INLAYS

Anton Soukup, Chicago, Ill.

Application February 15, 1934, Serial No. 711,436

3 Claims. (Cl. 144—309)

This invention relates to a method of forming inlays, the general object of the invention being to provide a method whereby the inlays may be easily and cheaply formed by cementing a plurality of pieces of wood together to form an elongated block, the pieces being of contrasting color, and then cutting the block transversely into small blocks which, when placed on a surface and glued or cemented together, will form an attractive design.

The accompanying drawings illustrate the manner of carrying out the invention, and in these drawings:—

Figures 1, 2 and 3 show three pieces of wood of contrasting color which are to be glued or cemented together.

Figure 4 shows the elongated block formed by such pieces of wood after they are connected together.

Figure 5 is a perspective view showing how the corner of the block is rabbeted to form an angle-shaped recess.

Figure 6 is a view of the two strips of wood which are to be glued or otherwise fastened in said recess.

Figure 7 is a perspective view showing the elongated block with the strips secured in the recess.

Figure 8 is a view showing three of the small blocks formed by cutting the block shown in Figure 7 transversely.

Figure 9 is a top plan view showing a portion of the article, the upper face of which is formed of the blocks shown in Figure 8, this view also showing the strips of paper or the like in position for holding the small blocks in place while the glue or cement is drying.

Figure 11:
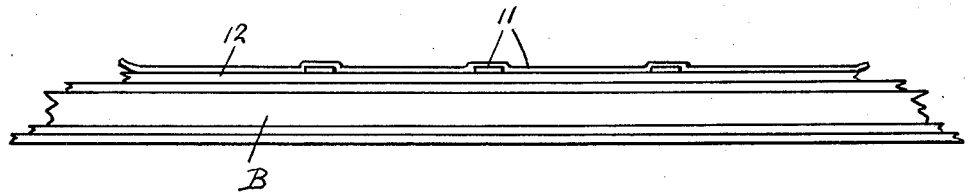
Figure 11 is an edge view of Figure 9.
Figure 12:
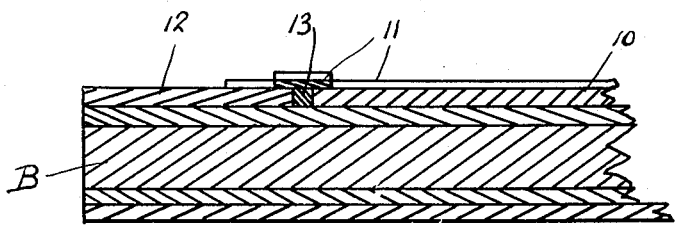
Figure 12 is a section on line 12—12 of Figure 9.

As shown in these drawings, I take three elongated pieces of wood, shown at 1, 2 and 3, of contrasting colors, with the piece 2 much thinner than the pieces 1 and 3, and I glue or cement these pieces together to produce the elongated block shown at 4 in Figure 4. Then the corners of the block are cut away, as shown by the dotted lines 5 in Figure 4 to produce the block of elongated shape and of rectangular shape in cross section, shown at 6 in Figure 5. As shown in this figure, the thin piece 2 extends diagonally from one corner of the block 6 to the other corner thereof. The upper corner of the block 6, which is formed in part of the upper edge of the piece 2, is then rabbeted to form the angle-shaped recess 7 and then the two pieces of wood, shown at 8 and 9 in Figure 6, are placed in the two parts of the recess and glued or cemented therein, as shown in Figure 7. These strips 8 and 9 are also of a contrasting color to the other pieces. Then the block 6', as shown in Figure 7, is cut with a band-saw or the like transversely to form the four blocks 10, shown in Figure 8. These blocks 10 are then assembled on a laminated base B, shown more particularly in Figures 11 and 12, and are fastened to the upper part of the base by glue or cement and the edges of the blocks are fastened together by glue or cement and in order to hold the blocks 10 in place while they are being fastened to the base, I provide strips 11 of gummed tape which overlaps the various blocks, as shown in Figures 9, 11 and 12. After the glue or cement has set, the strips are removed and the inlaid surface sanded.

Figure 13:
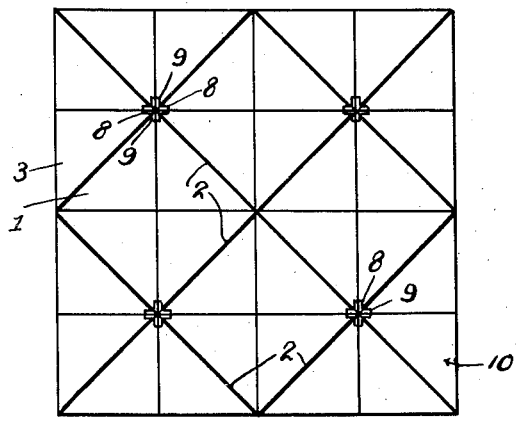
Figures 13, 14 and 15 are views showing other designs which may be formed by the inlays.

In order to facilitate placing of the small blocks in the formation of various designs, it is preferable to make the block 6' shown in Figure 7 of square shape in cross section so that the small blocks 10 will be of square shape, as shown in Figure 8. To produce the design shown in Figure 10, four of the blocks are placed together with the corners which carry the strips 8 and 9 abutting and in order to produce the design shown in Figure 13, four of the small blocks are placed to form a square, with the corners formed by the strips 8 and 9 outermost and with the blocks surrounding this square having the corners formed by the strips 8 and 9 abutting the said corners.

Figure 10:
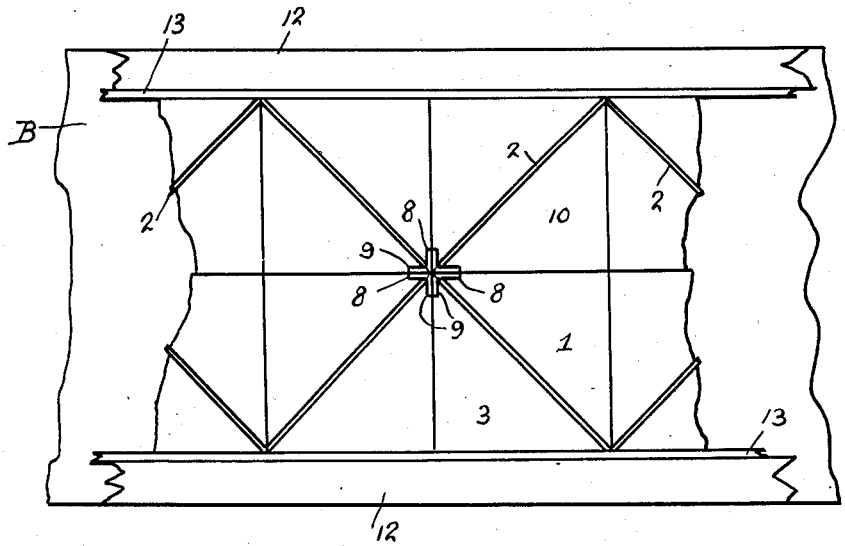
Figure 10 is a view of the article after being completed.
Figure 14:
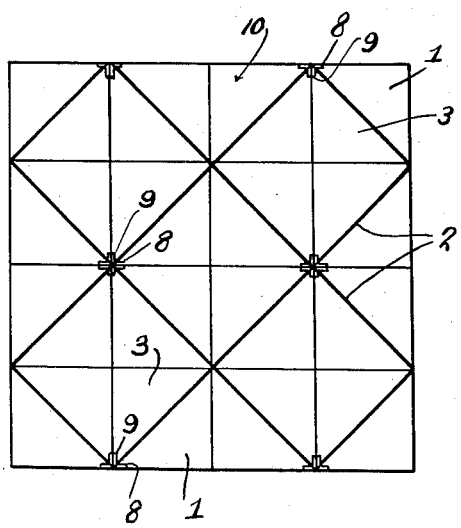
Figure 15:
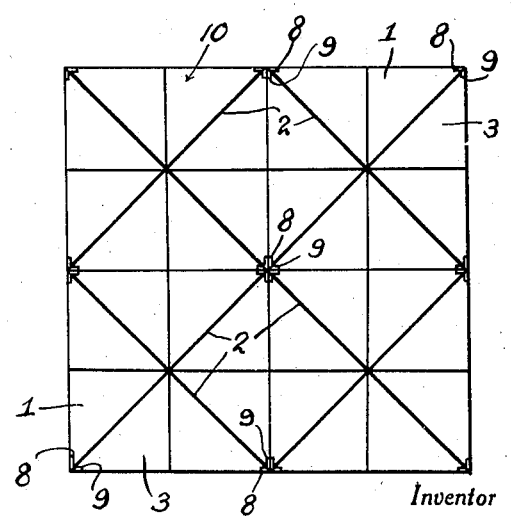

Figure 14 shows another way of placing the four blocks 10 to form another design, and Figure 15 shows a design somewhat similar to that shown in Figure 10, but using a greater number of the small blocks 10.

By forming the small blocks as above described and as shown in the drawings, an attractive inlaid unit is provided due to the grain in the wood and to the arrangement of the contrasting colors of the various pieces making up the block and various designs can be formed by the inlaid units by simply arranging them in different positions in forming the designs.

The invention can also be carried out by gluing together pieces of wood at random or in a haphazard manner and then cutting the blocks formed by said pieces transversely to form the inlaid blocks. This will produce a design by experimentation.

As shown in Figures 9 and 10, the inlaid article may be formed with a border 12 which is separated from the inlays by a strip 13.

What is claimed is:—

1. The herein described method of forming inlays, consisting in fastening together a plurality of elongated pieces of wood of contrasting color, then cutting the corners off the block formed by fastening said pieces of wood together to provide an elongated block of rectangular shape in cross section with the pieces of wood extending diagonally, and then cutting the block transversely to form the inlays.

2. The herein described method of forming inlays, consisting in fastening together a plurality of elongated pieces of wood of contrasting color to provide an elongated block of substantially rectangular shape in cross section, then cutting a corner of the block to form an angle-shaped recess, then filling the recess with strips of contrasting colors and then cutting the block transversely to form the inlays.

3. The herein described method of forming inlays, consisting in fastening together a plurality of elongated pieces of wood of contrasting color, then cutting the corners off the block formed by fastening said pieces of wood together to provide an elongated block of rectangular shape in cross section with the center piece of wood extending diagonally, then cutting a corner of the block to provide an angle-shaped recess, then placing strips of wood of contrasting colors in said recess, and then cutting the block transversely to form the inlays.

ANTON SOUKUP.